(12) United States Patent
Brennesholtz

(10) Patent No.: US 6,508,557 B1
(45) Date of Patent: Jan. 21, 2003

(54) REFLECTIVE LCD PROJECTOR

(75) Inventor: Matthew S. Brennesholtz, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/605,489

(22) Filed: Jun. 28, 2000

(51) Int. Cl.[7] .................. G03B 21/00; G03B 21/26; G03B 21/28; G03B 21/14; G02F 1/1335

(52) U.S. Cl. .................. 353/98; 353/33; 353/34; 353/37; 353/97; 353/99; 349/7; 349/67

(58) Field of Search .................. 353/31, 33, 34, 353/37, 98, 97, 99; 349/5, 7, 67

(56) References Cited

U.S. PATENT DOCUMENTS

| | | | |
|---|---|---|---|
| 4,680,579 A | 7/1987 | Ott | 340/783 |
| 5,170,194 A | 12/1992 | Kurematsu et al. | 353/52 |
| 5,231,433 A | 7/1993 | Yoshida et al. | 353/63 |
| 5,555,041 A | 9/1996 | Manabe | 353/98 |
| 5,959,778 A * | 9/1999 | Shimonura et al. | 359/618 |
| 6,157,420 A * | 12/2000 | Nakanishi et al. | 349/9 |
| 6,179,423 B1 * | 1/2001 | Kato et al. | 353/31 |
| 6,183,090 B1 * | 2/2001 | Nakanishi et al. | 353/20 |
| 6,217,174 B1 * | 4/2001 | Knox | 353/31 |
| 6,220,730 B1 * | 4/2001 | Hewlett et al. | 362/297 |
| 6,227,670 B1 * | 5/2001 | Numazaki et al. | 353/31 |
| 6,243,152 B1 * | 6/2001 | Knox et al. | 349/86 |

FOREIGN PATENT DOCUMENTS

| | | | |
|---|---|---|---|
| JP | 06289386 A | 10/1994 | |
| JP | 08201755 A | 8/1996 | G02F/1/13 |
| JP | 08248348 A | 9/1996 | G02B/27/09 |
| JP | 10301057 A | 11/1998 | G02B/27/18 |
| JP | 10307277 A | 11/1998 | G02B/27/18 |
| WO | WO9920054 | 4/1999 | H04N/9/31 |
| WO | WO9926103 | 5/1999 | G02B/27/18 |

OTHER PUBLICATIONS

"Improving the Efficiency and Image–Uniformity of a Simple Reflective Light Valve Projector" by A.G.Dewey in IBM Technical Disclosure Bulletin, vol. 22 No. 11, Apr. 1980.

* cited by examiner

Primary Examiner—Russell Adams
Assistant Examiner—Magda Cruz

(57) ABSTRACT

A projection system is disclosed that utilizes a modulator, preferably in the form of an LCD matrix, to modulate light in accordance with a video image to be displayed. The light is supplied to the LCD matrix, reflected back off the matrix through a lens to a mirror, and then imaged through another lens. The mirror is placed in the path between the light source and the LCD matrix.

12 Claims, 4 Drawing Sheets

REFLECTIVE LCD PROJECTOR

TECHNICAL FIELD

This invention relates to LCD projectors, and more particularly, to a method and apparatus for providing an LCD projector that eliminates inefficiencies present in prior systems by maximizing the useful area for projection.

BACKGROUND OF THE INVENTION

Generic LCD projectors are becoming more widely used in business applications. These types of projectors are typically used for business presentations, educational sessions, etc.

FIG. 1 shows a typical reflective liquid crystal device (LCD) projector. The arrangement of FIG. 1 represents a monochrome type of projector, but extension to color systems is known to those of skill in the art. For example, color systems may be implemented using an X-cube and a plurality of different color specific modulators. This technique is well known in the art, and will not be described in detail.

In the arrangement of FIG. 1, LCD 101 is a matrix of reflective LCD elements. Each element may rotate the polarization of incident light by up to 90 degrees. A polarizing beam splitter 102 passes light polarized in a first direction but reflects light polarized in a second and orthogonal direction.

In operation, light from lamp 104 is prepolarized by prepolarizer 105 and transmitted horizontally through polarized beam splitter (PBS) 102. The light exiting lamp 104 is collimated into substantially parallel columns. The polarized light passes plane 107 and is incident upon LCD 101.

The elements of R-LCD 101 are arranged to change the polarization of the incident- light in accordance with a video signal driving R-LCD 101. This technique results in the light being reflected back from R-LCD 101 in a variety of different states. More specifically, some of the light is reflected back after having its polarization rotated, and other light remains polarized in the same direction as when it was initially incident upon R-LCD 101. Additionally, the light may have its polarization only partially rotated, providing for shades of gray. Each of the numerous elements in the LCD matrix may independently rotate the polarization of incident light by a different amount.

Upon being reflected back, the light which has not had its polarization changed passes back through plane 107 and is absorbed. Light which was incident upon R-LCD elements and which did have its polarization changed will not pass through plane 107, but will instead be reflected up through the post-polarizer 109 for projection as an image through projection lens 110. Light which has had its polarization changed by some degree will partially pass and result in gray shades rather than black and white. In short, the polarization may be rotated by any amount between zero and 90 degrees, with angles between these two extremes representing shades of gray.

Several problems exist with R-LCD projectors of the type shown in FIG. 1. One problem is that the rays are not strictly S-polarized or P-polarized as they hit the plane 107. This results in decreased contrast. For a more complete description of this problem and a proposed solution, see U.S. Pat. No. 5,453,859, issued Sep. 26, 1995.

Another problem associated with the systems of the type shown in FIG. 1 is stressed induced birefringence in the PBS 102. This phenomenon occurs because the PBS is warmed non-uniformly by the optical beam passing through it. The differential warming of the glass induces stress in the glass, which in turn induces birefringence in the glass. Prior attempts at solving the problem have been less than optimum.

A second prior art LCD projector design utilizes an off-axis LCD projector of the type shown in FIG. 2. A lamp 104 and prepolarizer 105 transmit polarized light to a reflective LCD 101. The polarization of the light is then either changed or not, or changed to some degree, by the state of the various LCD elements. As was the case for FIG. 1, the LCD elements are driven by a video signal, and thus, the polarization of the reflected light beam 203 has been modulated in accordance with the video signal. That reflected light beam is then transmitted through a post-polarizer 109 for projection via lens 110.

The basic problem with the arrangement of FIG. 2 is the inefficient use of the pupil of the projection lens, which is located approximately at plane "B." More specifically, a large portion of the optical beam that would otherwise be captured by the projection lens is blocked by the path of the light from lamp 104. Thus, the usable pupil of the system is approximately one quarter of the full pupil of the projection lens, significantly reducing system efficiency. FIG. 3 depicts the pupil utilization in the prior art off-axis projector such as that shown in FIG. 2. It can be seen that about three quarters of the pupil area is wasted.

In view of the above there exists a need in the art for an improved reflective LCD projector which can efficiently utilize a larger pupil area and which eliminates the foregoing problems.

SUMMARY OF THE INVENTION

The above and other problems with the prior art are overcome in accordance with the present invention. A light source provides light to a modulator, which reflects back a modulated light signal that has been modulated in accordance with a video signal to be imaged. A mirror is interposed between the light source and the modulator. A portion of the light from the light source is blocked from reaching the modulator by the back of the mirror, but the modulated reflected light is focused entirely on the reflecting surface of the mirror and reflected through a projection lens by the mirror.

The mirror is positioned such that it only blocks a small portion of the incident light from the light source, thereby increasing efficiency. It may be placed directly in the path of incident light. In an additional embodiment, the mirror may be curved.

In a preferred embodiment, the modulator is a matrix of R-LCD elements.

Color may be obtained by utilizing an X-cube or similar device.

DETAILED DESCRIPTION OF THE PREFERRED EMBODIMENT

Figure 1:
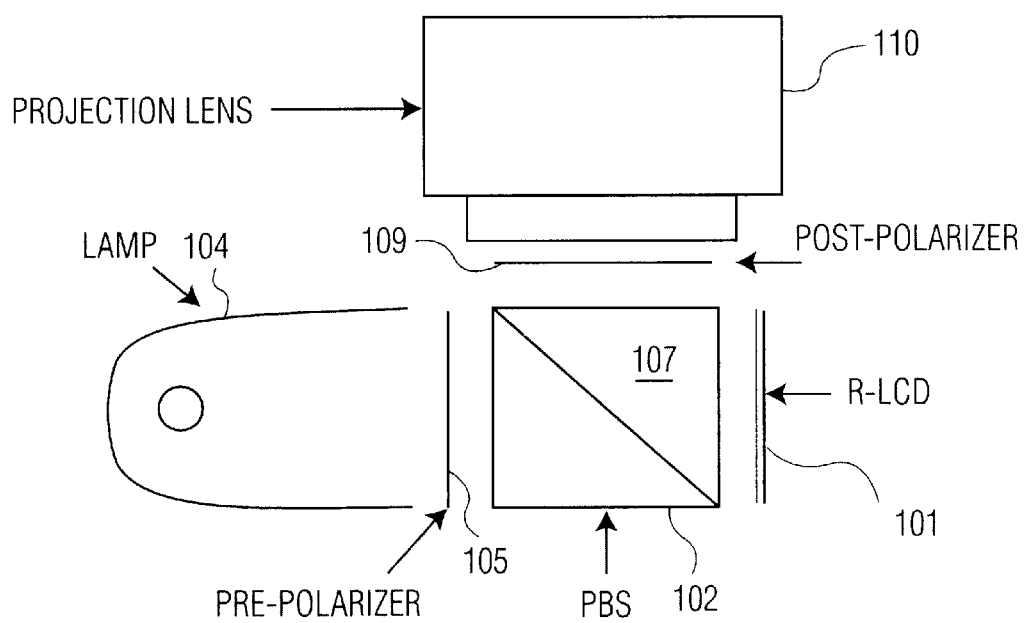
FIG. 1 in the prior art LCD projector.
Figure 2:
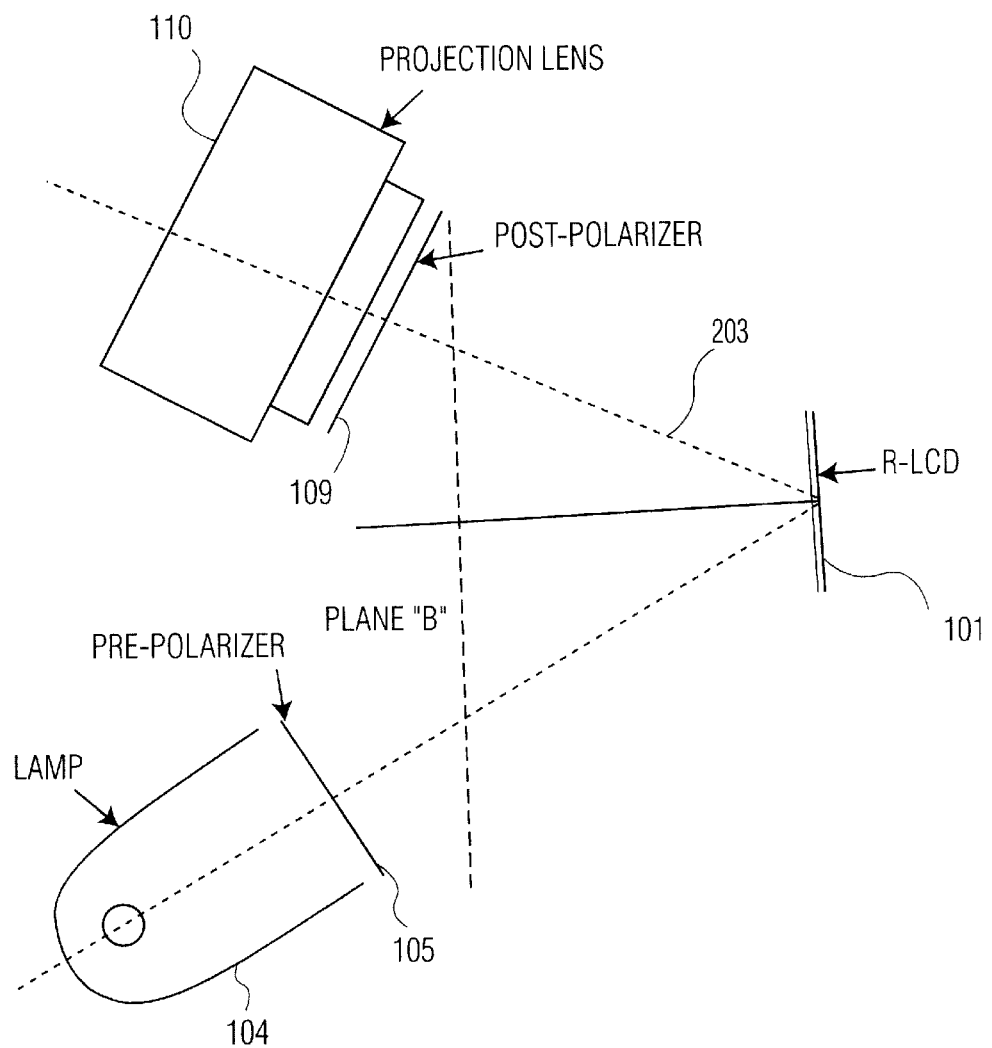
FIG. 2 is a different type of prior art LCD projector.
Figure 3A:
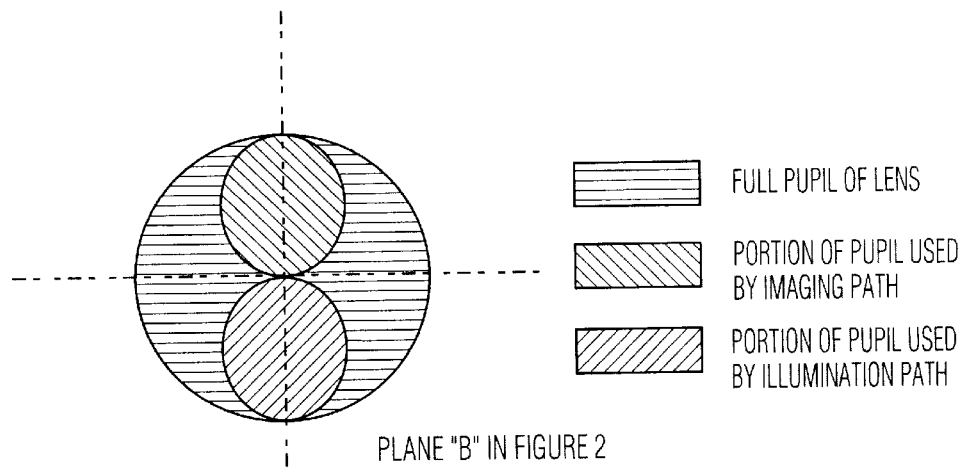
FIG. 3a shows a depiction of an inefficient use of the pupil in the prior art arrangement of FIG. 2.
Figure 3B:
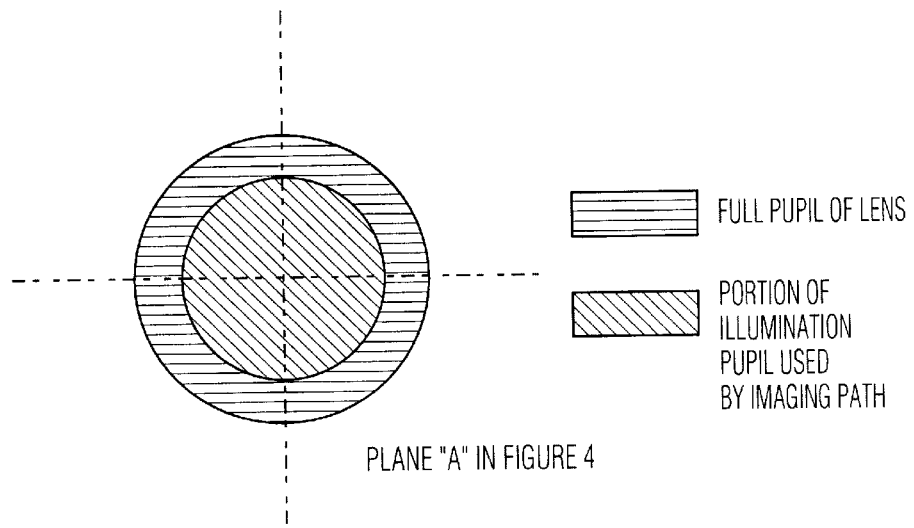
FIG. 3b shows a depiction of the utilization of the pupil in the illumination path of the current invention and FIG. 4 shows an exemplary embodiment of the present invention.
Figure 4:
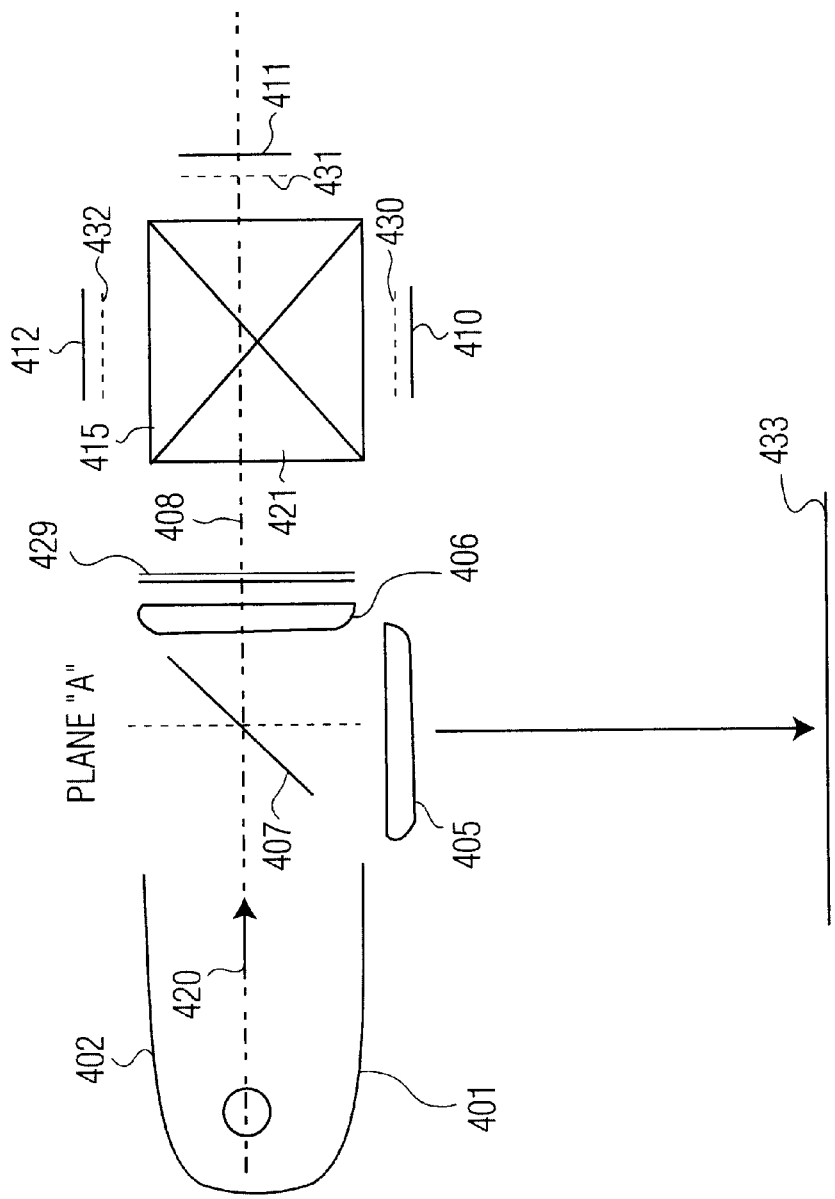

FIG. 4 shows an exemplary embodiment of the present invention including a light source 401, lenses 405 and 406, a mirror 407 and polarizer 429, and an LCD 411. Modulators 410–412 and X-cube 415 provide color in a conventional manner. It is noted that polarizers 430–432 may be used instead of, not in addition to, polarizer 429. For explanation we assume polarizer 429 is utilized.

In operation, light from source 401 leaves reflector 402 and is transmitted substantially parallel towards lens 406. Mirror 407 blocks the light from passing left to right over a substantially circular cross-sectional area. Since the mirror 407 is tilted as shown, the mirror is elliptical in shape such that the cross-section, viewing the tilted mirror from point 420, is circular. In a prototype, a mirror from Edmund Scientific, model number 30837, was found to give satisfactory performance. The circular cross section of the mirror may be substantially concentric with a cross section of the light emitted by light source 401. Plane "A" is located approximately at the pupil plane of the illumination path.

The mirror may also be curved slightly in order to add power to the projection lens. More specifically, if the mirror is curved, power may be added to the projection lens even though elements 405 and 406 of the projection lens remain at the same power. Given the design and performance parameters of the mirror, those of skill in the art can readily calculate the required curvature, and software packages for performing such calculations are available commercially.

After passing the mirror, the light then passes through lens element 406 but contains a substantially circular dim portion, which represents the cross-section that has been blocked by mirror 407. After being polarized, the light is transmitted through X-cube 415 and is modulated by the R-LCDs 410, 411 and 412.

After reflecting off of the LCD matrix 411, and being modulated thereby, the light is then transmitted back through X-cube 415 and polarizer 429. The reflected light is then focused upon the reflecting surface of mirror 407 for projection through projection lens elements 405–407 to projection screen 433. Note that 406 and 405 must act together as two elements of the projection lens, along with mirror 407. Although we refer to lenses 405 and 406, these lenses actually act together as lens elements to form a projection lens with mirror 407.

The operation of the X-cube 415 will not be described in specific detail since such an X-cube is known to those of skill in this art. Suffice it to say however, that white light enters the cube at surface 421 and the red, green and blue components are directed toward modulators 410, 411 and 412 respectively. The polarization of the red, green and blue components of the white light is modulated by modulators 410, 411 and 412 respectively. The red, green and blue components then are recombined into white light and the white light then exits the X-cube at surface 421. After passing through polarizer 429, the components with the undesired polarization are removed and the white light beam has been modulated in accordance with the video signal driving the LCDs 410, 411 and 412. This technique is conventional to those of skill in the art and will not be described in detail herein.

The distance between lens element 406, R-LCD matrix 411 and mirror 407 is such that the light incident upon lens element 406 is focused upon mirror 407. It is noted that the polarizer 429 may be relocated in positions 430, 431 and 432 as indicated in FIG. 4. These additional positions are preferred as they result in no optical elements being placed between the polarizer and the LCD which gives maximum contrast. This location for the polarizer also results in the reduced power loading on the polarizers due to the fact that there are separate polarizers in the red, green and blue channels. This results in increased lifetime. Note that due to the presence of mirror 407 in the pupil plane "A", the system cannot be telecentric, unlike most other reflective LCD projection systems.

The system as described represents a full color projector. A monochrome projector could be built in accordance with the invention by omitting the X-prism 415, light modulators 410 and 412 and polarizers 430 and 432 if polarizers 430–432 are used rather than polarizer 429.

While the above describes the preferred embodiment of the invention, various modifications will be apparent to those of skill in the art. Such modifications are intended to be covered by the following claims.

What is claimed:

1. Apparatus for projecting an image comprising:
   a light source for providing light including a first light portion of substantially circular cross-section and a second light portion;
   a modulator for receiving said second light portion and modulating a property of said second light portion in accordance with a video signal to be displayed to produce a modulated light signal corresponding to said video signal, and for reflecting said modulated light; and
   a blocking element positioned between the light source and the modulator for blocking said first light portion of substantially circular cross-section, and for reflecting substantially all of the modulated light into a projection lens.

2. The apparatus of claim 1 wherein said property is the polarization associated with said light.

3. The apparatus of claim 2 wherein said blocked first light portion is substantially concentric with a cross section of said provided light.

4. The apparatus of claim 2 further comprising a lens disposed between the modulator and the light source, the lens being disposed at a distance from said modulator source such that light passing though said lens from said light source is focused upon said modulator.

5. The apparatus of claim 4 wherein said modulator is a reflective LCD matrix.

6. The apparatus of claim 5 further comprising a polarizer disposed between said LCD matrix and said lens.

7. Apparatus of 6 further comprising an X-cube disposed between said lens and said modulator.

8. Apparatus of claim 7 wherein said polarizer is disposed between said x-cube and said modulator.

9. Apparatus for producing an image, the apparatus comprising:
   a modulator for modulating light in accordance with a video image to be displayed;
   two elements of a projection lens, arranged substantially perpendicular to each other, and positioned to receive the modulated light from the modulator;
   a blocking element disposed between the two elements at an angle such that an annular portion of light passes around the blocking element to be received and transformed into the modulated light by the modulator, the modulated light is received through one of said elements and is reflected through the other of said elements by a reflecting surface of the blocking element to display the video image.

10. Apparatus of claim 9 further comprising a polarizer placed in front of the modulator so that light first passes through said polarizer, is incident upon said modulator, and is retransmitted back through said polarizer.

11. The apparatus of claim 10 wherein said modulator is a reflective LCD device.

12. Apparatus of claim 11 further comprising an X-cube interposed between said one of said elements of the projection lens and said LCD device.

* * * * *